2,940,952

PREPARATION OF BLOCK COPOLYMERS

Mary L. Miller, New York, N.Y., assignor to American Cyanamid Company, New York, N.Y., a corporation of Maine No Drawing. Filed June 10, 1957, Ser. No. 665,623

7 Claims. (Cl. 260—45.5)

This invention relates to the process of preparing block copolymers and to the novel product produced thereby. More particularly, the invention relates to a process of making block copolymers containing as an integral part of the copolymer polymer blocks of a monomer selected from the group consisting of acrylonitrile and acrylic acid, or the methyl substituted derivatives of these monomers with polymer blocks of at least one other dissimilar monomer which has substantial solubility in an aqueous medium.

Copolymers are generally prepared by mixing the monomers in the desired ratio and subjecting the resulting mixture to the polymerizing conditions usually in the presence of an activating agent. The resulting product is known as a "random" copolymer. The monomer molecules in random type copolymers usually unite in a more or less disorganized fashion; the polymer being made up of molecules which are substantially homogeneous but irregular in structural arrangement. These copolymers vary considerably in molecular weight. Due to this random arrangement, many of the desirable properties of the corresponding homopolymers are found lacking in random copolymers.

The block copolymers prepared according to the process of the present invention differ also from graft copolymers which have a molecular structure consisting of backbone chains with pendant branches of a different polymer attached to the backbone.

The type of copolymer to which the present invention is directed, i.e., block polymers, are those copolymers having a linear structure which is segregated in blocks comprising homopolymer units of the respective monomers.

According to the invention, a monomer selected from the group consisting of acrylonitrile, methacrylonitrile, acrylic acid and methacrylic acid is dissolved in an organic brominating agent containing 1 to 4 carbon atoms and having three bromine atoms on one of the carbon atoms. The monomer is thereafter polymerized by irradiation with light of appropriate ranged wave lengths which decomposes the brominating agent to generate free radicals thereby forming polymer molecules with bromine atoms on the ends of the molecule. The bromine-containing polymer is subsequently separated and used as the starting material for the preparation of the block copolymer. In making the block copolymers the bromine-containing polymer is dissolved in a suitable aqueous solvent together with at least one dissimilar monomer having substantial water solubility, i.e. at least about 5% solubility in water and the solution is subjected to light of an appropriate range of wave lengths which initiates copolymerization by knocking off bromine atoms from the bromine-containing polymer to form the block copolymers.

It is an object of the present invention to provide a process for producing linear block copolymers of vinyl-type monomers which have a relatively high molecular weight. The specific copolymers contemplated are those containing as an essential component a monomer selected from the group consisting of acrylic acid, methacrylic acid, acrylonitrile and methacrylonitrile and at least one other monomer having substantial water solubility. Other objectives and advantages of the invention will become apparent from the detailed description given hereinafter.

The process of the invention is based upon the discovery of the appropriate combination of solvents and range of wave lengths. In carrying out the above process, the monomers, acrylic acid or acrylonitrile will be described although the methyl derivatives of these monomers may be employed.

As the second monomer which has substantial solubility, the use of acrylamide will be described, although various other monomers having at least partial water solubility, i.e. a solubility in aqueous media of at least 5%, may be utilized. Other monomers which are suitable are such as methacrylamide, methylolacrylamide, vinyl pyrrolidone, vinyl pyridine, the methyl vinyl pyridines, N-methyl vinyl pyridinium chloride, acrolein, maleic acid, crotonic acid, sodium acrylate, allyl alcohol, methyl acrylate, methyl vinyl carbinol, dimethylaminoethyl methacrylate, and the like.

The nature of the invention may be better understood by reference to the following procedure, wherein the effect of light radiation on organic brominating agents containing respectively three, two and one bromine atoms on one of the carbon atoms are employed. The data obtained is set forth in Table I. In this procedure, acrylonitrile is mixed with equal volumes of (1) bromoform, $CHBr_3$, (2) dibromomethane, $CH_2Br_2$ and (3) bromoethane, $C_2H_5Br$, and the respective batches together with a blank (4) containing no brominating agent, are exposed to a sunlamp under two different conditions. First, the light is screened by a filter which cuts off light of wave lengths less than 3100 angstroms. Secondly, a filter which cuts off light wave lengths of less than 2900 angstroms was used.

The results show that one bromine atom is split off from the bromoform (1) with the first filter (3100 angstroms) in place, but not off from the compounds containing only two or one bromine atoms on a single carbon. With the second filter (2900 angstroms), bromine is split off from a carbon containing two bromine atoms on a single carbon atom (2) after one-half hour exposure. A bromine atom on a carbon substituted with a single bromine (3) is not activated before the time that the blank, (4) containing acrylonitrile alone, starts to polymerize.

The sun, or other similar light source, such as from a G.E. sunlamp may be used to activate the bromine containing polymer to add polymer blocks of the second monomer. The intensity of the light applied may vary over a considerable range. It is necessary, however, that the light have a minimum wave length of from at least 3100 angstrom units be employed, as wave lengths below this value provide undesirable activation. The light to be used in preparing the initial polymer-containing bromine units at the end of the polymer molecules is accordingly screened by a filter which lets through light with wave length down to 3100 angstroms. I have discovered that light having this minimum wave length effectively activates polymerization to form polymer molecules which are further utilized with a dissimilar monomer to prepare block copolymers.

This initial irradiation causes the photodecomposition of a bromine atom from the brominating agent containing at least three bromine atoms on a single carbon atom. In the case of broomform, the reaction proceeds in the following manner:

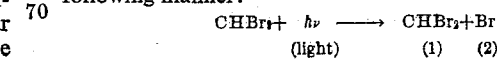

Each of these radicals, (1) and (2) will initiate polymerization to give polyacrylonitrile or polyacrylic acid with $CHBr_2$ and Br end groups on the polymer molecules. I have discovered that radiation in this wavelength, i.e. not below 3100 angstrom units and preferably in the range of 3100 to 4100 angstrom units, does not decompose the —$CHBr_2$ or the —Br containing end groups on the polymer molecules.

The polymer with the —$CHBr_2$ and —Br end groups is then isolated, or otherwise freed from $CHBr_3$, and dissolved in a suitable solvent (i.e. a solvent that does not act as a chain-transfer agent). Suitable solvents are such as water, concentrated aqueous salt solutions, etc. A dissimilar monomer, i.e. acrylamide (or any monomer that dissolves in the solvent chosen) is added to the polymer solution and the mixture is exposed to light from a sunlamp, or other similar source, screened by a filter such as Pyrex glass which lets through light down to, but not below 2800 angstrom units. This light will split a bromine atom from the —$CHBr_2$ end group on the polymer molecules to leave a free radical, —CHBr, on the end of the polymer molecule which adds acrylamide (and generate another free radical) to form the block polymer. The bromine free radical, Br, liberated at the same time, also adds acrylamide to form polyacrylamide homopolymer.

Light of these wave lengths, i. e. about 2900 angstroms will knock one and only one bromine atom off of a carbon loaded with two bromines, but will not touch a bromine on a carbon that has only one bromine atom. Therefore, the molecules with —CHBr and Br end groups will not be photolyzed and will not initiate polymerization.

In the polymerization to form initial polymer which is subsequently employed to form the block copolymer, it is critical that the light band employed not include light waves of wave length below 3100 angstroms. Light having a wave length below 3100 angstroms tends to decompose the bromine on the polymer molecules to be employed in making the block copolymer. There is also a tendency toward branch formation and toward homopolymerization of the monomer to the exclusion of the required bromine end units.

In the coreaction of the bromine-containing polymer and dissimilar monomer, light waves below about 2800 angstrom units have a tendency to form branching and to homopolymerize the dissimilar monomer in preference to the desired linear block copolymer formation.

TABLE I

*Time required to polymerize acrylonitrile with different photosensitizers, hours*

| Brominating Agent | Light Screened by Filter with Cut-off at 310°λ | | Light Screened by Filter with Cut-off at 290°λ | |
|---|---|---|---|---|
| | Trace of Polymer | Thick Polymer | Trace of Polymer | Thick Polymer |
| (1) $CHBr_3$ | 1 | 2¾ | | |
| (2) $CH_2Br_2$ | >3 | | ½ | 2¾ |
| (3) $C_2H_5Br$ | >3 | | 2 | >3 hrs. |
| (4) None | >3 | | 2 | >3 hrs. |

In addition to bromoform, suitable organic brominating agents of the class having from 1 to 4 carbon atoms and having three bromine atoms on one of the carbon atoms are such as bromal; 1,1,1-tribromo-ethane; 1,1,1-tribromo-propane; 1,1,1-tribromo-butane; tribromo-acetic acid; 3,3,3-tribromo-propionitrile; 3,3,3-tribromo-butyronitrile and the like.

The period of exposure to the light to effect sufficient activation to produce the polymer containing bromine and the subsequent block copolymer may vary over a considerable range. When the process is operated in a continuous manner wherein the monomers are allowed to flow past a series of quartz light bulbs the initial period of exposure will only be a matter of a few minutes, e.g., 1 to 3 minutes. In a static operation, however, where light of a smaller intensity will generally be utilized the period of exposure will be much longer, e.g. 25 minutes to 5 hours.

The temperature employed during the initial exposure to the light may vary over a wide range. Many of the monomers are not thermally polymerizable and in those cases the process will be relatively independent of the temperature employed. In the thermal polymerization of monomers which can be thermally polymerized extremely high temperatures should be avoided as they give rise to undesirable bulk polymers. In general, temperatures between 0° C. and 100° C. may be used, although it is preferred that the temperature be maintained below that at which monomers spontaneously polymerize in the presence of light.

The polymerization, according to the invention is conducted in solvents which do not effect chain transfer of the polymer. Suitable media are such as water, aqueous salt solutions of alkali metal perchlorates or thiocyanate, such as sodium, potassium and lithium perchlorates or thiocyanates or to a more limited extent in the case of polyacrylic acid, organic solvents such as benzene, toluene, etc. may also be used as sufficient water is compatible with these solvents to enable their use. Water or concentrated aqueous salt solutions are however the preferred solvents.

The procedure contemplated by the present invention employs light radiation as the sole source of activation. No additional catalyst is employed nor is required.

In the addition of the monomeric compound to be added to the bromine containing polymer, a single monomer as well as mixtures of two or more monomers may be employed.

Plasticizers and fillers such as glycerol, gums or sugars may also be added provided that the nature and quantity thereof is not employed in amounts such as to screen out the effective light radiations.

The novel polymers produced by the process of the invention are linear and have a high molecular weight. These polymers have higher softening points than random copolymers having the same mole ratio of the component monomers. They are particularly useful in the producing of fibers and as agents in the settling of sludges, ores, and as additives to paper and in soil conditioners. They may be molded to produce resins having many superior properties such as tensile strength, hardness and the like.

In order to more fully illustrate the process of the invention, the following examples are given. It is understood that the examples are for purposes of illustration only and are not to be regarded as limiting the invention except as specified in the appended claims. Parts used are parts by volume unless otherwise stated.

EXAMPLE 1

The initial blocks of polyacrylonitrile were made as follows: acrylonitrile and bromoform were mixed in the proportions, 25 parts of acrylonitrile to 15 parts of bromoform. The mixture is sealed in a suitable reaction vessel permitting exposure to light. The vessel is placed in an ice bath and a suitable light filter (ordinary window glass .5 mm. thick spaced 2½" above the vessel) is employed to screen out light waves less than 3100 angstrom units. A G.E. sunlamp spaced 3½" above the glass is employed as the light source. The vessel is irradiated in 15 minute exposures (with cooling and mixing between exposures to reduce the tendency to homopolymerization) for a total of 3 hours' exposure. The vessel is opened and the contents poured into methanol. The polymer is washed with methanol 3 times and then with acetone and air dried.

The molecular weight is estimated from the intrinsic viscosity in dimethylformamide at 30° C. Two preparations by this method had molecular weights of 135,000 and 265,000.

Two parts of the polyarcrylonitrile (prepared as shown above) are dissolved in 235 parts of 50% (by weight) sodium thiocyanate solution (prepared and kept free from oxygen by flushing and blanketing with $CO_2$). Three parts of acrylamide are added and the solution sealed in the vessel and exposed to the light from a sunlamp at 30–50° C. The light is screened to prevent wave length below 2900 angstrom units from passing through. Pyrex glass was used to provide the requisite light screening.

After the reaction is complete, the resulting mixture is poured into methanol. The block polymer of acrylonitrile-acrylamide is precipitated and extracted alternately and repeatedly with hot water and hot dimethylformamide. The block polymer is insoluble in both of these solvents.

The dimethylformamide extract contains any free polyacrylonitrile that is present. This extract was concentrated and methanol added to precipitate the polymer.

The water extract contained any free polyacrylamide that was present. The water extract is concentrated, dialyzed to remove salt and freeze-dried. The composition of all polymers was determined by infrared examination of thin films.

The block polymer, although insoluble in water and dimethylformamide, dissolves readily in dimethylsulfoxide and in concentrated salt solutions. This shows that the polymers are not cross-linked. The polymers give optically clear films and optically clear concentrated solutions that do not show a two phase structure when examined visually or by phase contrast microscopy. These facts are evidence that the polymers are block copolymers and not mixtures of homopolymers.

EXAMPLE 2

Blocks of polyacrylic acid are made by essentially the same method as was used for making blocks of polyacrylonitrile in Example 1. Several separate mixtures of acrylic acid and bromoform (in some experiments diluted with benzene) are irradiated as above at intervals of 15 minutes for total time of 30 to 45 minutes. The contents of the vessels become solid but are entirely soluble in water. After irradiation is finished the contents are washed into benzene, centrifuged and rewashed with benzene several times to remove bromoform and monomer. The polymer is dissolved in water and freeze-dried. Its molecular weight is estimated from the intrinsic viscosity measured to dioxane. This procedure gave polymers with molecular weights ranging from 145,000 to 540,000.

The polyacrylamide block was added to this polyacrylic acid block by the method previously used to add acrylamide to polyacrylonitrile. In an illustrative preparation, approximately ⅔ part of the undried or freeze-dried polyacrylic acid with end groups which contained bromine is dissolved in 100 parts of oxygen-free water under a blanket of carbon dioxide. Two parts of acrylamide is added and the solution is sealed in the reaction vessel and irradiated by an unscreened sunlamp. Irradiation is carried out at 25 to 35° C. for 2 hours. The contents of the vessel are poured into 500 cc. of dioxane and extracted twice with hot dioxane which dissolves any unreacted polyacid. The polymer insoluble in dioxane contains the block polymer and a small amount of polyacrylamide homopolymer which may be separated by fractionation if desired.

Data obtained on the block polymers of acrylonitrile and acrylamide prepared according to the invention is set forth in Table II. In this table, column 1 gives the mol percent of nitrile measured by infrared spectrometry; column 2, the molecular weight of the block polymer as computed from the molecular weight of the initial block and the composition of the polymer.

TABLE II

*Block polymers from acrylonitrile and acrylamide*

| Mole Percent of Acrylonitrile | Molecular Weight ×10⁻³ | Intrinsic Viscosity in 50% NaSCN at 30° C., deciliter per gram observed |
|---|---|---|
| 66 | 196 | |
| 63 | 360 | |
| 60 | 257 | 2.15 |
| 62 | 250 | 2.25 |
| 60 | 500 | |
| 33 | 935 | |
| 60–65 | 478 | 3.34 |
| 70–80 | 276 | 2.75 |
| 50 | 620 | 5.2 |

Table III sets forth data obtained on two block copolymers of acrylamide and acrylic acid. The molecular weight as set forth was determined by two methods. In the first determination, the polymers are hydrolyzed until hydrolysis stopped (at approximately 65% complete). The viscosity of this hydrolysis product was measured by dissolving a portion thereof in 1 N NaOH and the corresponding molecular weights read from a plot of the molecular weight versus viscosity of random copolymers of the same acid contents. In the second method, the molecular weight was computed from the composition of the copolymer and the molecular weight of the initial block of the acrylic acid on the basis that the initial polyacrylic acid has not been fractionated by the processing of the mixture produced by the copolymerization reaction.

TABLE III

*Intrinsic viscosities of block polymers from acrylic acid and acrylamide*

| Acid | Molecular Weight (×10⁻³) by— | | Intrinsic Viscosity Observed, dl./g. |
|---|---|---|---|
| | Hydrolysis | Computation | |
| 75 | 310 | 366 | 1.60 |
| 45 | 637 | 610 | 2.50 |

I claim:

1. A method of preparing block copolymers which comprises dissolving a monomer selected from the group consisting of acrylic acid, methacrylic acid, acrylonitrile and methacrylonitrile, in an organic bromine compound having from 1 to 4 carbon atoms and having three bromine atoms on the same carbon atom generating free radicals by decomposing said bromine compound with a light source supplying radiation having a wave length band including but not less than 3100 angstrom units, utilizing the free radicals generated to activate polymerization of said monomer, separating the resulting bromine-containing polymer, dissolving said polymer in an inert aqueous solvent together with a dissimilar vinyl monomer, said dissimilar vinyl monomer being characterized by having at least 5% solubility in aqueous media, and effecting copolymerization of said polymer and said monomer with a light source having a wave length band including but not less than 2800 angstrom units.

2. A method of preparing block copolymers which comprises dissolving a monomer selected from the group consisting of acrylic acid, methacrylic acid, acrylonitrile and methacrylonitrile, in an organic bromine compound having from 1 to 4 carbon atoms and having three bromine atoms on the same carbon atom generating free radicals by decomposing said bromine compound with a light source supplying radiation having a wave length between 3100 and 4100 angstrom units, utilizing the free radicals generated to activate polymerization of said monomer, separating the resulting bromine-containing polymer, dissolving said polymer in an inert aqueous solvent together with a dissimilar vinyl monomer, said dissimilar vinyl monomer being characterized by having at least 5% solubility in aqueous media, and effecting copolymerization of said polymer and said monomer with a light source having a wave length band including but not less than 2800 angstrom units.

3. A method of preparing a block copolymer comprising dissolving acrylonitrile in an organic bromine compound having from 1 to 4 carbon atoms and having three bromine atoms on the same carbon atom, generating free radicals by decomposing said bromine compound with a light source supplying radiation in the band of wave lengths of between 3100 and 4100 angstrom units, utilizing the free radicals generated to activate polymerization of said acrylonitrile, separating the resulting bromine-containing polyacrylonitrile, dissolving said polymer in an inert aqueous solvent together with monomeric material comprising acrylamide and effecting copolymerization of said polyacrylonitrile and said monomeric material by activating said bromine-containing polyacrylonitrile with a light source having a wave length band including but not less than 2800 angstrom units.

4. A method of preparing a block copolymer comprising dissolving acrylonitrile in bromoform, generating free radicals by decomposing said bromoform with a light source supplying radiation in the band of between 3100 and 4100 angstrom units, utilizing the free radicals generated to activate polymerization of said polyacrylonitrile, separating the resulting bromine-containing polyacrylonitrile, dissolving said polymer in an inert aqueous solvent together with acrylamide and effecting copolymerization of said polyacrylonitrile and said acrylamide by activating said bromine-containing polyacrylontrile with a light source having a wave length band including but not less than 2800 angstrom units.

5. A method of preparing a block copolymer comprising dissolving acrylic acid in an organic bromine compound having from 1 to 4 carbon atoms and at least three bromine atoms on the same carbon atom, generating free radicals by decomposing said bromine compound with a light source supplying radiation in the band of wave lengths between 3100 and 4100 angstrom units, utilizing the free radicals generated to activate polymerization of said acrylic acid, separating the resulting bromine-containing polyacrylic acid, dissolving said polyacrylic acid in an inert solvent together with a monomeric material comprising acrylamide, and effecting copolymerization of said polyacrylic acid and said monomeric material by activating said bromine-containing polyacrylic acid with a light source having a wave length band including but not less than 2800 angstrom units.

6. A method of preparing a block copolymer comprising dissolving acrylic acid in bromoform, generating free radicals by decomposing said bromoform with a light source supplying radiation in the band of wave lengths between 3100 and 4100 angstrom units, utilizing the free radicals generated to activate polymerization of said acrylic acid, separating the resulting polymer containing polyacrylic acid, dissolving said polymer in an inert solvent together with acrylamide and effecting copolymerization of said polyacrylic acid and acrylamide with a light source having a wave length band including but not less than 2800 angstrom units.

7. A linear block copolymer of acrylic acid and acrylamide having blocks of homopolymer units of acrylic acid chemically combined with homopolymer units of acrylamide.

References Cited in the file of this patent

UNITED STATES PATENTS

| | | |
|---|---|---|
| 2,133,257 | Strain | Oct. 11, 1938 |
| 2,539,376 | Standinger | Jan. 23, 1951 |
| 2,649,434 | Coover et al. | Aug. 18, 1953 |

FOREIGN PATENTS

| | | |
|---|---|---|
| 499,577 | Canada | Jan. 26, 1954 |

OTHER REFERENCES

Immergut et al.: Die Makromolekulare Chemie, XVIII–XIX, (March, 1956) pp. 324–341.

Henglein: Die Makromolekulare Chemie, vol. 14, pages 128–145.

Dunn et al.: "The Synthesis of Block Copolymers of Styrene and Methyl Methacrylate," Transactions of the Faraday Society, vol. 50 (1954), pages 279–281, 283.

Chemistry and Industry, April 6, 1957, page 426.

UNITED STATES PATENT OFFICE
CERTIFICATION OF CORRECTION

Patent No. 2,940,952                                June 14, 1960

Mary L. Miller

It is hereby certified that error appears in the above numbered patent requiring correction and that the said Letters Patent should read as corrected below.

Column 2, line 68, for "broomform" read -- bromoform --; column 4, line 73, for "hours'." read -- hours --; column 6, Table II, third column thereof, the heading should appear as shown below instead of as in the patent:

-- Intrinsic Viscosity in 50% NaSCN at 30° C.
(deciliter per gram) dl./g. observed --.

Signed and sealed this 11th day of July 1961.

(SEAL)
Attest:

ERNEST W. SWIDER                                DAVID L. LADD

Attesting Officer                                     Commissioner of Patents